(12) United States Patent
Vanderpan

(10) Patent No.: US 6,443,401 B1
(45) Date of Patent: Sep. 3, 2002

(54) AGRICULTURAL CLIP SYSTEM AND METHOD

(75) Inventor: Ron Vanderpan, Pacific Grove, CA (US)

(73) Assignee: Doorframer, Inc., Pacific Grove, CA (US)

( * ) Notice: Subject to any disclaimer, the term of this patent is extended or adjusted under 35 U.S.C. 154(b) by 0 days.

(21) Appl. No.: 09/764,730

(22) Filed: Jan. 17, 2001

(51) Int. Cl.⁷ ............................. F16L 3/00; E21F 17/02
(52) U.S. Cl. .......................... 248/62; 248/65; 248/74.1; 248/74.3; 248/75
(58) Field of Search .................... 248/49, 65, 74.1, 248/74.3, 75, 231.81, 300; 403/279, 345, 346, 394, 396; 47/44

(56) References Cited

U.S. PATENT DOCUMENTS

| | | | | |
|---|---|---|---|---|
| 3,893,647 A | * | 7/1975 | Kennedy | 248/68.1 |
| 4,024,604 A | * | 5/1977 | Klimek et al. | 24/16 R |
| 4,635,886 A | * | 1/1987 | Santucci et al. | 248/73 |
| 4,709,889 A | * | 12/1987 | Erickson | 248/74.5 |
| 5,358,423 A | * | 10/1994 | Burkhard et al. | 439/402 |
| 5,474,268 A | * | 12/1995 | Yu | 248/61 |
| 5,819,374 A | * | 10/1998 | Chiles et al. | 24/16 PB |
| 5,857,429 A | * | 1/1999 | Hostetler | 119/72.5 |
| 6,343,772 B1 | * | 2/2002 | Oi | 248/75 |
| 2001/0042813 A1 | * | 11/2001 | Taylor | 248/75 |

* cited by examiner

Primary Examiner—Leslie A. Braun
Assistant Examiner—Deborah Brann
(74) Attorney, Agent, or Firm—Gray Cary Ware & Freidenrich

(57) ABSTRACT

An agricultural clip is provided that holds a first agricultural element, such as an irrigation pipe or wire, in a predetermined relationship with a second agricultural element, such as a wire. For example, the agricultural clip is used to keep the irrigation holes in an irrigation pipe pointed down to deposit water where needed.

6 Claims, 6 Drawing Sheets

AGRICULTURAL CLIP SYSTEM AND METHOD

BACKGROUND OF THE INVENTION

This invention relates generally to a mechanism for holding an agricultural element and in particular to a clip for holding a first agricultural element in a predetermined relationship to another agricultural element.

For various agricultural purposes, such as providing irrigation or holding a vine or wire, it is desirable to be able to hold an agricultural element, such as an irrigation pipe or a wire, locked into a particular position. A long time ago, farms and the like used sprinklers, ditches and other mechanisms to provide water to crops and other agricultural products. For example, a farmer might divert water into a field in order to provide water to the crops planted in that field. The problem with these typical approaches to watering is that they are very inefficient and very wasteful of water. For example, instead of providing the necessary water only to the base of the plant that needs to water, the water is provided to the entire field so that a lot of water soaks into the soil, but does not provide any nutrients to the plants in the field. As water became more scarce and more expensive due to droughts and the like, a new system and technique for providing water to the plants in the field was needed.

To provide water efficiently to the plants in the fields, a drip irrigation system was developed. With a drip irrigation system, water is distributed to each plant in the field by a network of interconnecting irrigation pipes which are typically made of plastic. At a location where the pipe passes adjacent to each plant, the pipe is punctured or has an existing hole so that the hole exists in the pipe at that location near the plant. Then, when water is fed through the network of irrigation pipes, water drips out of the hole and provides nourishment directly to the plant without wasting water. Some irrigation pipes have been developed in which an emitter is inserted into the irrigation pipe during manufacture in order to provide a predetermined amount of water to a plant. Typically, the irrigation pipe may be secured to a wire with a clip or connector so that the pipe waters predetermined plants. The problem with this system is that the clip permits the pipe to rotate such that the holes in the pipe are no longer pointing directly down. Thus, when water exits the holes in the pipe, it does not necessarily fall where it is intended. For example, the water may flow down the outside of the pipe until a low point in the pipe is encountered and then drip to the ground. To solve the above problem, some companies have developed clips, in addition to the clips that secure the pipe to the wire, which are attached to the pipe at some predetermined points and cause the water to drip onto the ground at that point. These clips ensure that the water does not travel along the outside of the pipe. However, this requires a farmer or his workers to attach these additional clips to solve the problem. It is desirable therefore to provide a clip which both secures the irrigation pipe to a wire and ensures that the water is delivered to the desired location. Thus, it is desirable to provide an agricultural clip that and it is to this end that the present invention is directed.

SUMMARY OF THE INVENTION

The agricultural clip in accordance with the invention has several different uses. It may be used to secure an irrigation pipe to a wire in a predetermined relationship so that one or more holes in the irrigation pipe are in a predetermined location. The clip also ensures that the holes remain in the predetermined location and therefore that the water that exits from the irrigation pipe is deposited in the appropriate location. The clip may also puncture the irrigation pipe as the irrigation pipe is inserted into the clip. The clip in accordance with the invention is resilient so that it securely holds the wire and the irrigation pipe. The clip is also resistant to temperature fluctuations. In accordance with another use of the invention, the clip may be used to secure two crossing wires together for such applications as dried on the vine raisins. Thus, the clip may be generally used to secure a first agricultural element, such as a wire or irrigation pipe, into a predetermined relationship with a second agricultural element, such as a wire.

The clip may be formed from a single piece of metal wherein the strip may have a central portion and first and second end portions that are narrower that the central portion. The agricultural clip may be formed by bending the strip so that a curved bottom portion is formed with the end portions overlapping each other.

Thus, in accordance with the invention, an agricultural element clip for holding a first agricultural element in a predetermined relationship with a second agricultural element is provided. The clip comprises a bottom curved portion capable of holding the first agricultural element and first and second end portions attached to the bottom portion at opposite sides. The first and second end portion overlap each other and are capable of being locked into a position to secure the second agricultural element into a predetermined position with respect to the first agricultural element.

In accordance with another aspect of the invention, an agricultural clip for holding an irrigation pipe in a predetermined relationship with a wire is provided. The clip comprises a curved portion capable of holding the irrigation pipe and first and second end portions attached to the bottom portion at opposite sides. The first and second end portion overlap each other and are capable of being locked into a position to secure the wire into a predetermined position with respect to the irrigation pipe. The bottom curved portion further comprises one or more spikes that puncture the irrigation pipe to cause water fed through the pipe to leak out of the punctures wherein the location of the punctures cannot move are fixed in position by the one or more spikes embedded into the irrigation pipe.

In accordance with yet another aspect of the invention, an agricultural clip for holding a first wire in a predetermined relationship with a second wire is provided. The clip comprises a bottom curved portion and first and second end portions attached to the bottom portion at opposite sides wherein the first and second end portion overlap each other and are capable of being locked into a position to secure the first wire. The first and second end portions each further comprise a cutout region that form a hole in the clip when the clip is formed so that the second wire may be inserted through the hole to secure the second wire in a predetermined relationship with the first wire.

In accordance with another aspect of the invention, a method for manufacturing an agricultural clip is provided. To manufacture the clip, a flat strip of metal is formed having a central portion and thinner end portions and the strip is bent to form a lower curved portion of the clip that holds a first agricultural element. The narrower end portions of the strip are then bent to form overlapping tongue portions that lock a second agricultural element in place so that the agricultural clip holds the first agricultural element in a predetermined position with respect to the second agricultural element.

DETAILED DESCRIPTION OF A PREFERRED EMBODIMENT

The invention is particularly applicable to securing an irrigation pipe to a wire (the first embodiment) and crossing wires to each other (the second embodiment) and it is in this context that the invention will be described. It will be appreciated, however, that the agriculture clip in accordance with the invention has greater utility since it can be used to secure a first agricultural element to a second agricultural element in a predetermined relationship.

Figure 1:
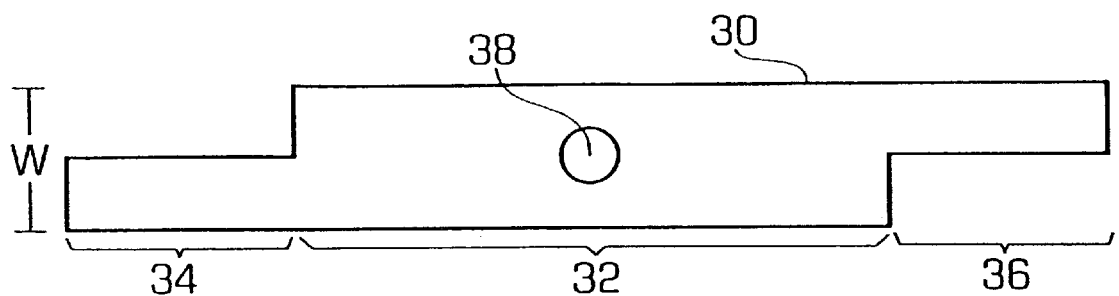
FIG. 1 is a diagram illustrating a strip of material that may be used to make an agricultural clip in accordance with a first embodiment of the invention.

FIG. 1 is a diagram illustrating a strip of material 30 that may be used to make an agricultural clip in accordance with a first embodiment of the invention. The strip of material may any metallic material with sufficient strength to form the clip in accordance with the invention. In a preferred embodiment, the material may be spring steel which is formed into the agricultural clip and then heat treated to harden the agricultural clip and produce the desired spring characteristics of the agricultural clip. In a preferred embodiment, spring steel may be used. As shown, the strip may have a central portion 32 having a predetermined width, W, a first end portion 34 having a smaller width than the central portion and a second end portion 36 also having a smaller width that the central portion. In a preferred embodiment, each end portion may be approximately one-half the width of the central portion. The strip may have a hole 38 formed in the center thereof wherein the purpose of the hole will be described below. In accordance with the invention, the strip shown in FIG. 1 may be bent at appropriate locations to form the agricultural clip in accordance with the invention.

Figure 2:
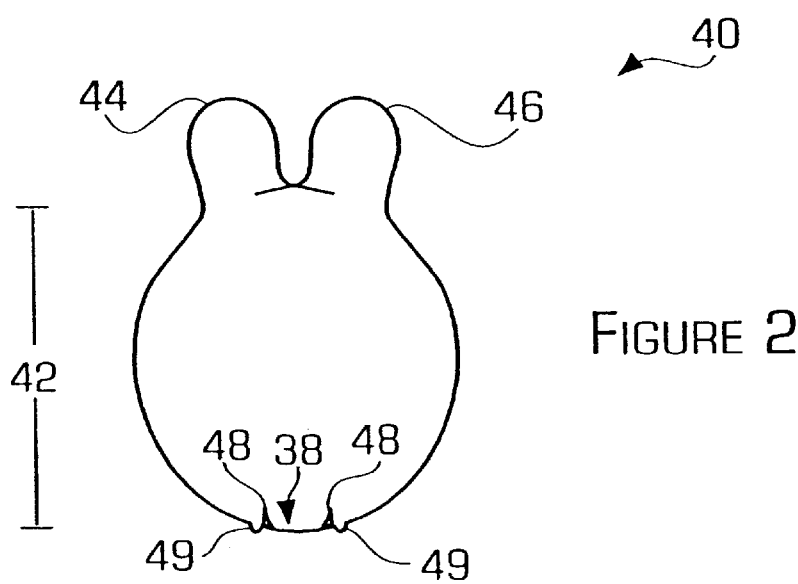
FIG. 2 is a front view of the first embodiment of the agriculture clip formed from the strip shown in FIG. 1.
Figure 4:
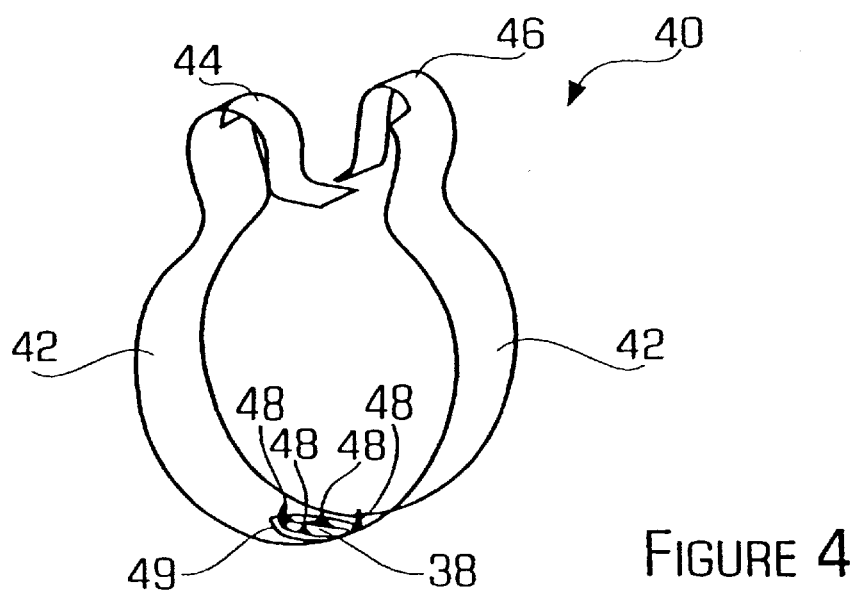
FIG. 4 is a perspective view of the agriculture clip of FIG. 2.

FIG. 2 is a front view of the first embodiment of the agriculture clip 40 formed from the strip shown in FIG. 1 and FIG. 4 is a perspective view of the agriculture clip of FIG. 2. As shown, the clip may have a bottom portion 42 with a curved shape (although a clip with a differently shaped bottom portion would also be within the scope of the invention), a first end portion 44 and a second end portion 46 that overlap each other as shown in FIG. 4. The clip is made such that the first and second end portions 44, 46 are held in an overlapped position by a spring force due to the construction of the clip and the material used to manufacture the clip. In accordance with the invention, that spring force overlapping the first and second end portions 44, 46 may be overcome so that the overlapping end portions may be spread apart to permit a first and second agricultural element, such as an irrigation pipe for the first agricultural element and a wire as the second agricultural element in this embodiment, to be inserted into the clip as described below with more detail with reference to FIGS. 6–13. The first and second end 44, 46 may each have a curved portion and a straight end wherein the straight ends of the first and second end portions overlap as shown. In accordance with the invention with the first and second end portions 44, 46 are formed from the first and second narrow width end portions 34, 36 of the strip shown in FIG. 1. In this embodiment, the bottom portion 42 may be appropriated sized so that an irrigation pipe fits snugly into the bottom portion and the curved portion of the first and second end portions 44, 46 may be sized to snugly hold a typical wire that may be used to support irrigation pipes.

In accordance with the invention, the first and second end portions may also lock the positions of the first and second agricultural elements, such as the irrigation pipe and the wire in this embodiment, into a predetermined relationship with each other as will also be described in more detail below. In addition, the hole 38 formed in the bottom of the bottom portion 42 may also hold the irrigation pipe and its water drip holes in this embodiment in a predetermined relationship with the wire as described below. In particular, the hole 38 may hold the irrigation pipe since one or more spikes 48 may be formed when the hole is created as described below. The hole 38 may also permit the water exiting the irrigation pipe to drop to the ground directly underneath the irrigation pipe holes which is desirable. In forming the one or spikes 48, a dimple 49 surrounding the spikes is formed.

Figure 3:
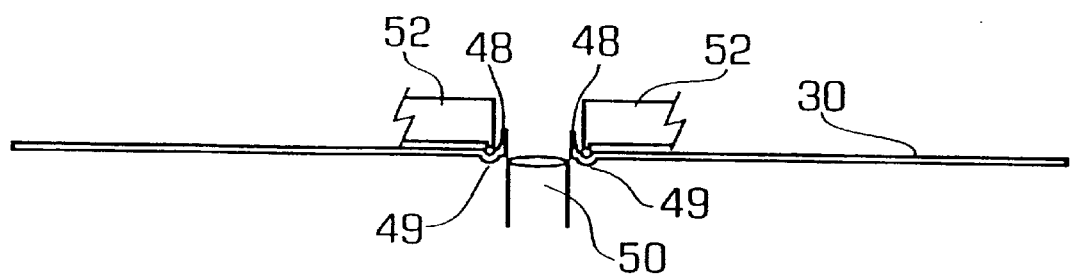
FIG. 3 is a diagram illustrating an example of a method for producing the one or more spikes in the bottom of the agriculture clip.

FIG. 3 is a diagram illustrating an example of a method for producing the one or more spikes 48 and the dimple 49 in the bottom of the agriculture clip strip 30. As shown, a punch 50 having a predetermined diameter and a backing plate 52 having a slightly larger diameter may be used. As is well known, the punch 50 may be used to punch the hole into the strip 30. Due to the difference in diameters between the punch and the backing plate, as the punch punches through the strip to form the hole, the one or more spikes 48 and the dimple 49 are created. The dimple 49 ensures that water from the irrigation pipe that flows down the outside of the spikes 48 will drop to the ground at the bottom of the dimple. In other words, the dimple 49 helps to ensure that any water that travels down the outside of the spikes 48 will not travel down the irrigation pipe.

The invention is not limited to any particular method or technique for creating the hole in the strip. In accordance with the invention, when the irrigation pipe is placed into the bottom portion 42 and assuming that the irrigation pipe is made of a material, such as plastic, the spikes dig into the irrigation pipe and puncture the irrigation pipe to form the water holes in the irrigation pipe at the bottom of the irrigation pipe and ensure that the holes in the pipe remain pointed directly down towards the ground. In an alternative embodiment, the irrigation pipe already has irrigation holes in it so that the spikes are somewhat shorter so that they merely dig into, but not puncture the irrigation pipe in order to hold the irrigation pipe in the proper position for watering the agriculture. Now, the end portions 44,46 will be described in more detail.

Figure 5:
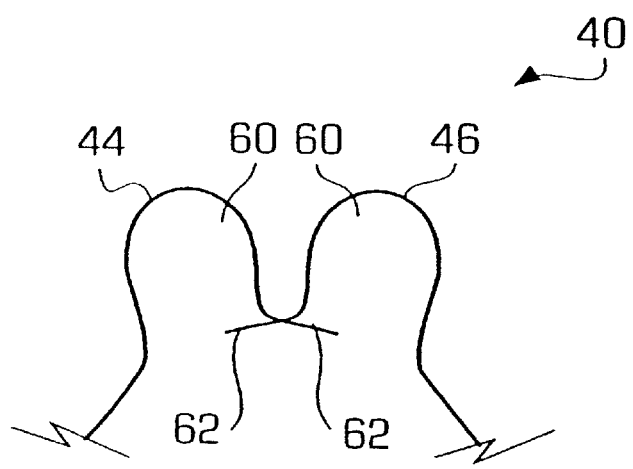
FIG. 5 is a close-up view of the end portions of the agriculture clip of FIG. 3.
Figure 6:
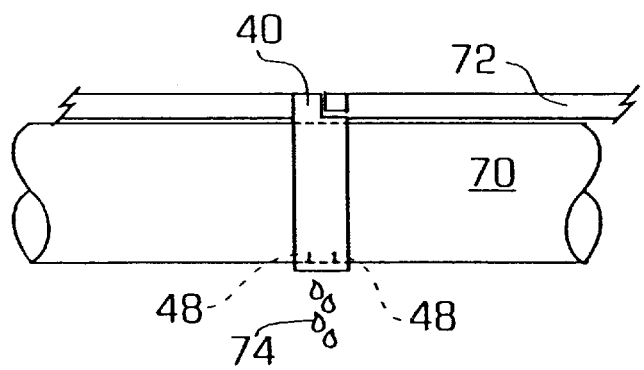
FIG. 6 is a side view of an irrigation pipe and a wire secured using the first embodiment of the agriculture clip.

FIG. 5 is a close-up view of the end portions 44, 46 of the agriculture clip of FIG. 4. As shown, each end portion may include a curved portion 60 and a substantially straight end 62 wherein the ends 62 overlap with each other as described above. In accordance with this embodiment of the invention, the curved portions 60 are of substantially similar size and are sized to snugly fit a typical gauge wire used for supporting irrigation pipes. FIG. 6 is a side view of an irrigation pipe 70 and a wire 72 secured using the first embodiment of the agriculture clip 40. The method for placing the irrigation pipe and wire into the clip will be described below with reference to FIGS. 7–13. As shown, drops of water 74 may exit the bottom of the irrigation pipe and drip directly underneath the irrigation pipe as it desirable to avoid wasting water. Due to the clip, the relative positions of the irrigation pipe and the wire are fixed so that, for example, the hole/s in the irrigation pipe remain at the bottom of the pipe underneath the wire so that the water from the irrigation pipe is deposited in the desired spot. Now, more details of placing the irrigation pipe and wire in the first embodiment of the agricultural clip in accordance with the invention will be described.

Figure 9:
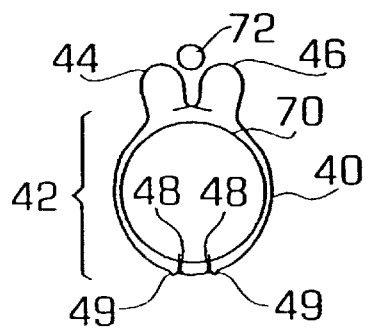
FIGS. 7–13 illustrate the irrigation pipe and the wire being inserted into the first embodiment of the agriculture clip.
Figure 7:
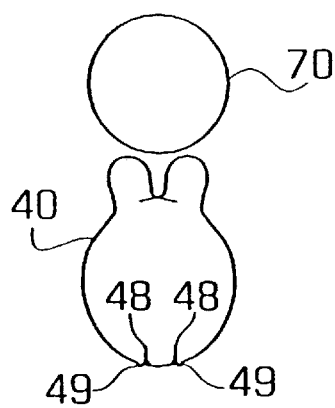
Figure 8:
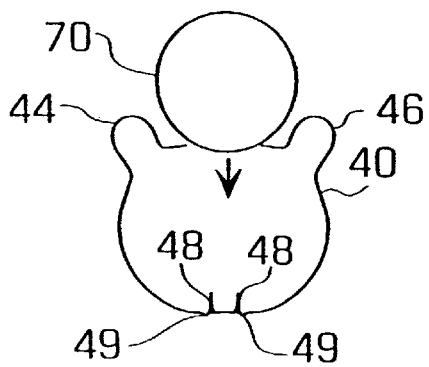

FIGS. 7–13 illustrate the steps for inserting the irrigation pipe and the wire into the first embodiment of the agriculture clip. As shown in FIG. 7, the pipe 70 is positioned to be inserted in the agricultural clip 40 that has the one or more spikes 48. In this example, an irrigation pipe without its own irrigation holes is being used. In FIG. 8, the irrigation pipe is inserted into the agricultural clip 40 which causes the end portions 44, 46 to separate from each other since the spring force that causes the end portions to overlap has been overcome. As shown in FIG. 9, the irrigation pipe is now within the bottom portion 42 and the end portions have returned to their overlapping relationship due to the spring force. In addition, as the irrigation pipe seats itself in the bottom portion, the one or more spikes 48 pierce the irrigation pipe to form irrigation water holes in the irrigation pipe as described above. In addition, the spikes 48 hold the irrigation pipe in a fixed position since the spikes 48 are embedded in the irrigation pipe. Once the irrigation pipe is seated in the bottom portion 42, the wire 72 is positioned to be inserted into the agricultural clip 40 as shown in FIG. 9.

Figure 10:
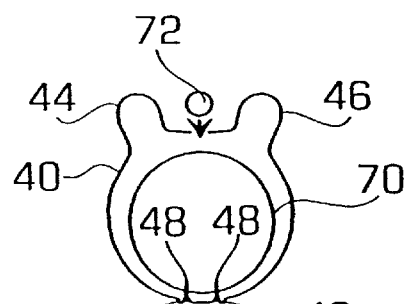
Figure 11:
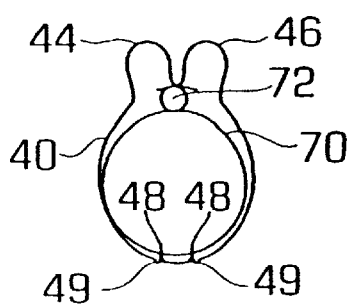
Figure 12A:
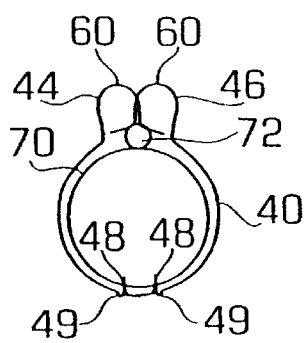
Figure 12B:
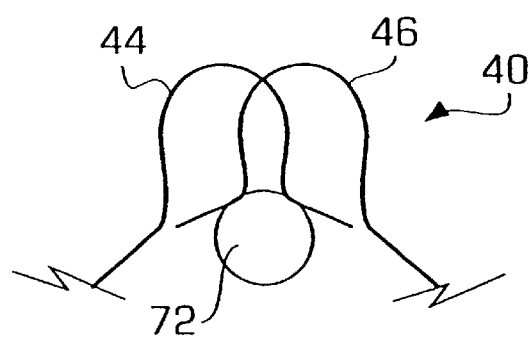
Figure 13:
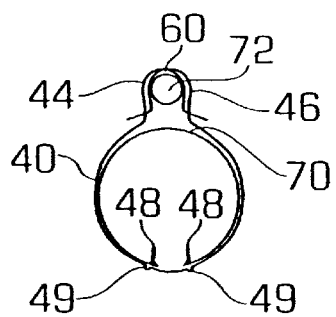
Figure 12C:
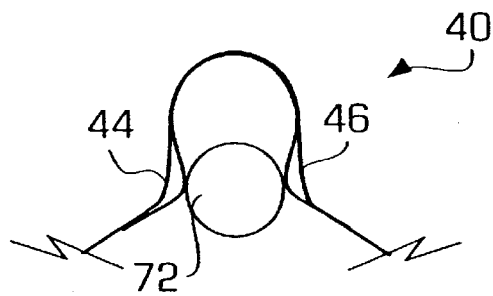

FIG. 10 illustrates the wire 72 being inserted into the agricultural clip which again overcomes the spring force of the agricultural clip and causes the end portions 44, 46 to separate. In this embodiment, the wire 72 is locked into the end portions 44, 46 and in particular the curved portion 60 as will be described. In FIG. 11, the wire 72 is within the clip so that the end portions 44, 46 return to their overlapping positions. However, at this point, the wire is sitting on top of the irrigation pipe and not locked in the end portions 44, 46. To lock the wire 72 into the end portions 44, 46, as shown in FIG. 12A, a user may pull down on the agricultural clip 40 which forces the wire upwards. As the wire is pulled upwards, it causes the two end portions 44, 46 to move towards each as shown in FIGS. 12B and 12C. When the wire is locked into the agricultural clip in accordance with the invention, the two end portions 44, 46 are in line with each other as shown in FIG. 13 so that the wire 72 is locked into the agricultural clip and cannot easily be unseated from the agricultural clip. To help lock the wire into the agricultural clip, the curved parts of the end portions 44, 46 may be shaped to be the proper size and shape to have a slightly smaller diameter than the wire 72. The curved parts may also have an entrance that is slightly smaller that the diameter of the wire to further lock the wire into the end portions. Thus, even if a smaller diameter wire is locked into the agricultural clip, the wire will be locked into the agricultural clip, but the agricultural clip may slide along the wire. Thus, using the agricultural clip in accordance with the invention, the relative positions of the irrigation pipe and its irrigation holes and the wire are fixed in position so that the water from the irrigation pipe is deposited directly underneath the holes in the irrigation pipe and the water does not run down the outside of the irrigation pipe as may occur with typical irrigation systems. Now, a second embodiment of the agricultural clip in accordance with the invention will be described that may be used to secure the positions of two wires relative to each other.

Figure 14:
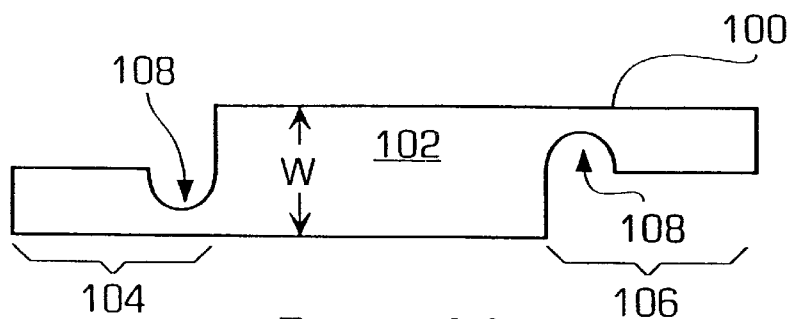
FIG. 14 illustrates a strip of material that may be used to form a second embodiment of an agriculture clip in accordance with the invention.

FIG. 14 illustrates a strip of material 100 that may be used to form a second embodiment of an agriculture clip in accordance with the invention. As with the first embodiment, the strip may be made of any material that may have sufficient strength and resiliency to generate the necessary spring force. The strip 100 may include a central portion 102 having a predetermined width, W, a first end portion 104 and a second end portion 106 that both have a narrower width than the central portion. In this embodiment, both the first and second end portions 104, 106 have a semi-circular cutout portion 108. The cutout portion may hold a wire as described below in more detail. In this embodiment, the agricultural clip may be used to maintain a predetermined relationship between a first wire and a second wire such as may be used for dried on the vine fruits, such as raisins. The strip 100 may be bent to form an agricultural clip as will now be described in more detail.

Figure 15:
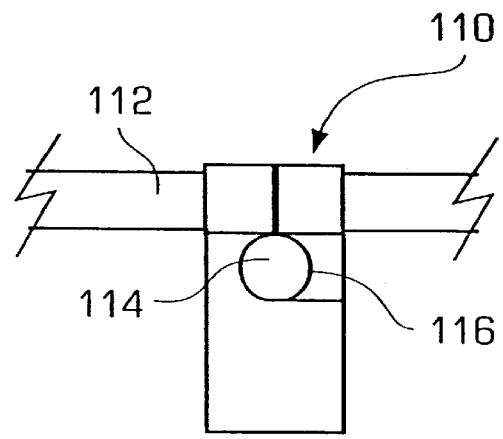
FIG. 15 is a side view of the second embodiment of the agriculture clip that secures a first wire and a second crossing wire.
Figure 16:
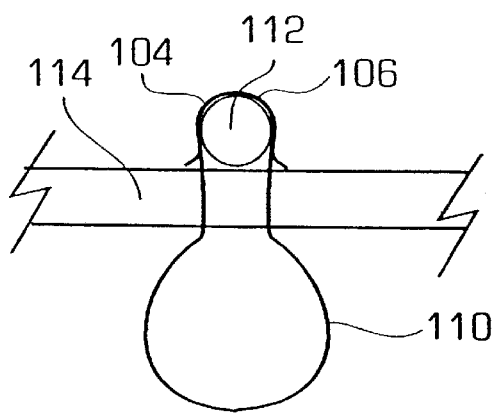
FIG. 16 is an end view of the two wires secured by the second embodiment of the agriculture clip in accordance with the invention.
Figure 17:
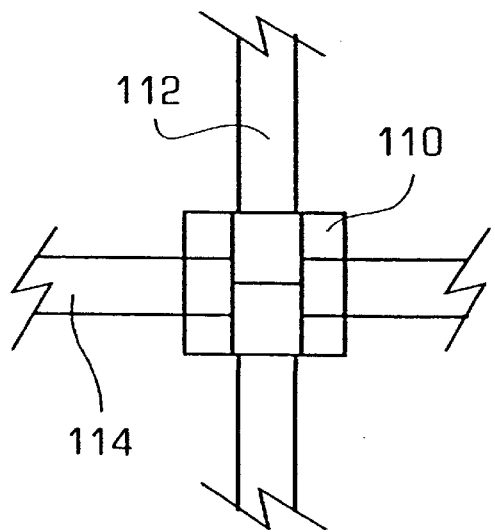
FIG. 17 is a top view of the two wires secured by the second embodiment of the agriculture clip in accordance with the invention.

FIG. 15 is a side view of the second embodiment of an agriculture clip 110 that secures a first wire 112 and a second wire 114 wherein the first and second wires cross each other substantially perpendicular to each other. FIG. 16 is an end view of the two wires 112, 114 secured by the second embodiment of the agricultural clip 110 and FIG. 17 is a top view of the two wires secured by the agricultural clip 110. In this embodiment, the first wire 112 is locked into the end portions 104, 106 of the clip as shown in FIG. 16. The second wire is held in place because it is passed through the hole 116 in the agricultural clip formed by the two cutout portions 108 (See FIG. 14) when the strip 100 is bent to form the agricultural clip. Thus, the second embodiment of the agricultural clip may be used to secure a first and second wire into a predetermined relationship with each other as may be useful for dried on the vine fruit. In this embodiment, the second wire 114 may be placed into the agricultural clip first and then the first wire 112 may be locked into the end portions as described above. Now, another embodiment of the agricultural clip in accordance with the invention will be described.

Figure 18:
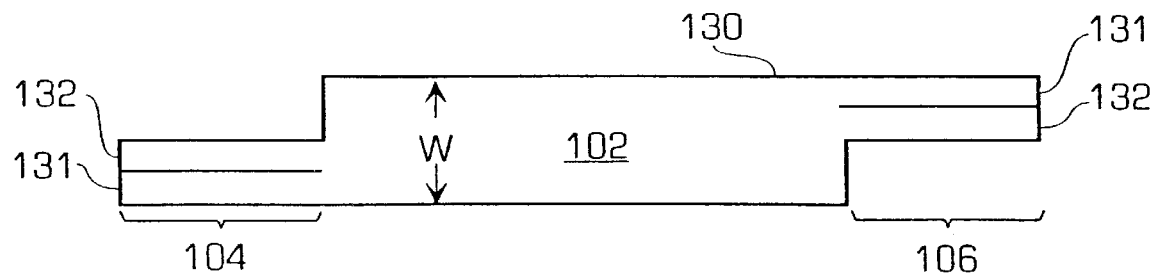
FIG. 18 illustrates a strip that may be used to manufacture a third embodiment of the agricultural clip.

FIG. 18 illustrates a strip 130 that may be used to manufacture a third embodiment of the agricultural clip 140. The central portion 102 is similar to the above embodiments. In this embodiment, the end portions 104, 106 may be split into two portions wherein, for each end portion, one portion 131 may form the end portion that locks onto the first wire 112 and a spring portion 132 may act to ensure that, once the agricultural clip is in place, the first and second wires 112, 114 do not have a gap in between them.

Figure 19:
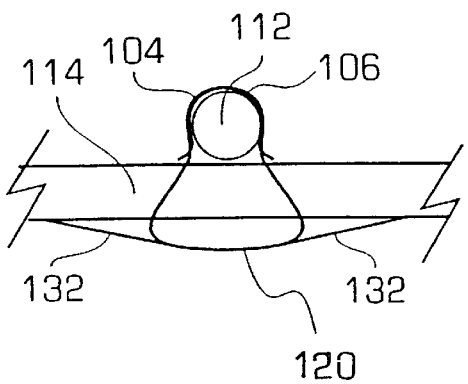
FIG. 19 is a side view of third embodiment of the agricultural clip that secures a first wire and a second crossing wire.
Figure 20:
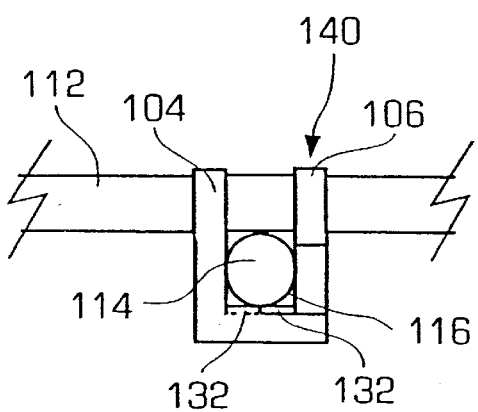
FIG. 20 is another side view of the third embodiment of the agricultural clip.

FIG. 19 is a side view of the third embodiment of the agricultural clip 140 that secures a first wire and a second crossing wire. In this embodiment, the construction and operation of the agricultural clip is similar to the previously described embodiment. In this embodiment, a bottom portion 120 of the agricultural clip is not curved as with the prior embodiments and is much smaller since the bottom portion does not hold an agricultural element. In addition, the spring portions 132 act to push the second wire 114 against the first wire 112. In particular, when the agricultural clip is installed, the spring portions 132 act to apply an upward force on the second wire 114 that pushes the second wire 114 against the first wire 112 to secure the two wires in a predetermined relationship with each other. When the second wire 114 is inserted into the agricultural clip, it rests on the spring portions 132. When the first wire 112 is inserted into agricultural clip, it pushes down on the second wire 114 and compresses the spring portions 132. When the first wire 112 is pulled up and locked into the end portions 104, 106, the spring portions 132 remain somewhat flexed and apply an upward force to press the second wire 114 against the first wire 112. As shown in FIG. 20, the agricultural clip 140 may have narrower end portions 104, 106 so that there is a slot in the top of the agricultural clip and the second wire 114 may be placed into the agricultural clip more easily. The second wire is held in position by the first wire 112 and the spring portions 132 which press the second wire 114 against the first wire 112.

In summary, the first and second embodiments of the agricultural clip may be used to hold a first agricultural element in a predetermined relationship with a second agricultural element. In the first embodiment, the first agricultural element is an irrigation pipe and the second agricultural element is a wire. In the second embodiment, the first agricultural element is a wire and the second agricultural element is also a wire that cross each other. The agricultural clip ensures that that relationship between the two agricultural elements is maintained while providing support to each agricultural element. In the first embodiment, the agricultural clip also ensures that the irrigation holes in the irrigation pipe remain pointed downwards to ensure that water from the irrigation pipe is deposited in the proper location.

While the foregoing has been with reference to a particular embodiment of the invention, it will be appreciated by those skilled in the art that changes in this embodiment may be made without departing from the principles and spirit of the invention, the scope of which is defined by the appended claims.

What is claimed is:

1. An agricultural element clip for holding a first agricultural element in a predetermined relationship with a second agricultural element, comprising:
    a bottom portion having one or more spikes that secure the first agricultural element to the clip; and
    first and second end portions attached to the bottom portion at opposite sides, the first and second end portion overlapping each other, the first and second end portions capable of being locked into a position to secure the second agricultural element into a predetermined position with respect to the first agricultural element.

2. The clip of claim 1, wherein the second agricultural element comprises a wire locked into the first and second end portions so that the punctures in the irrigation pipe are located directly underneath the wire.

3. The clip of claim 1, wherein the first and second end portions each further comprise a cutout region that form a hole in the clip when the clip is formed wherein a first wire is secured by the end portions and a second wire is passed through the hole formed by the cutout regions so that the first and second wires are held in a predetermined relationship with each other.

4. The agricultural clip of claim 3, wherein a slot region is formed between the first and second end portions so that the second wire may be placed into the hole of the clip.

5. The agricultural clip of claim 1, wherein the first and second end portions further comprise a spring portion at a predetermined angle to the bottom portion wherein the spring portions of the end portions push the second wire against the first wire.

6. The agricultural clip of claim 1, wherein each end portion comprises a locking portion and a spring portion wherein the locking portions are separated by a predetermined distance that is approximately equal to the diameter of a first wire wherein the second wire is placed into the agricultural clip between the locking portions, and supported by the spring portions, wherein the locking portions lock a first wire into the agricultural clip and the spring portions press the second wire against the first wire.

* * * * *